United States Patent
Yang et al.

(10) Patent No.: US 12,136,328 B2
(45) Date of Patent: Nov. 5, 2024

(54) APPARATUS AND METHOD FOR DETECTING SMOKE BASED ON POLARIZATION

(71) Applicant: Electronics and Telecommunications Research Institute, Daejeon (KR)

(72) Inventors: Hoe Sung Yang, Daejeon (KR); Soo Cheol Kim, Daejeon (KR); Hyun Seok Kim, Daejeon (KR); So Yung Park, Daejeon (KR); Kang Bok Lee, Daejeon (KR); Kwang Soo Cho, Daejeon (KR); Kyu Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 239 days.

(21) Appl. No.: 17/849,835

(22) Filed: Jun. 27, 2022

(65) Prior Publication Data
US 2023/0206741 A1 Jun. 29, 2023

(30) Foreign Application Priority Data
Dec. 23, 2021 (KR) .................. 10-2021-0186331

(51) Int. Cl.
*G08B 17/107* (2006.01)
*G01N 15/06* (2024.01)
(Continued)

(52) U.S. Cl.
CPC ......... *G08B 17/107* (2013.01); *G01N 15/06* (2013.01); *G01N 21/31* (2013.01); *G01N 21/534* (2013.01);
(Continued)

(58) Field of Classification Search
CPC .... G08B 17/107; G08B 29/185; G01N 15/06; G01N 21/31; G01N 21/534; G01N 15/075; G01N 2015/0046; G01N 2021/4792
See application file for complete search history.

(56) References Cited

U.S. PATENT DOCUMENTS 5,280,272 A * 1/1994 Nagashima .......... G08B 17/107
340/630
5,576,697 A * 11/1996 Nagashima .......... G08B 29/183
340/630
(Continued)

FOREIGN PATENT DOCUMENTS

EP 3214425 A1 * 9/2017 ............. G01N 15/06
EP 3319057 A1 * 5/2018 ............. G01N 21/21
(Continued)

OTHER PUBLICATIONS

Cho, HyoungJun, et al., "Polarized Light Scattering Spectroscopy for Particle Size Measurement on Surface", Hankook Kwanghak Hoeji, vol. 16, No. 6, Dec. 2005, (Abstract and 1 page in English, 4 pages in Korean).

*Primary Examiner* — Chico A Foxx
(74) *Attorney, Agent, or Firm* — NSIP Law

(57) ABSTRACT

Provided is an apparatus for detecting smoke based on polarization. The apparatus includes a chamber into which smoke is introduced, a detection unit comprising a light-emitting unit configured to emit light beams having a plurality of different wavelengths into a space in the chamber, and a light-receiving unit configured to receive scattered light from a plurality of light sources, a control unit configured to control an operation of the detection unit, and a fire determination unit configured to distinguish between fire smoke and non-fire analogous smoke by detecting and analyzing a light-receiving signal received by the light-
(Continued)

receiving unit, in which horizontal polarization and vertical polarization are applied to the plurality of light sources of the light-emitting unit and the light-receiving unit.

16 Claims, 5 Drawing Sheets

(51) Int. Cl.
    *G01N 21/31*     (2006.01)
    *G01N 21/53*     (2006.01)
    *G08B 29/18*     (2006.01)
    *G01N 15/00*     (2006.01)
    *G01N 15/075*    (2024.01)
    *G01N 21/47*     (2006.01)

(52) U.S. Cl.
    CPC ... *G08B 29/185* (2013.01); *G01N 2015/0046* (2013.01); *G01N 15/075* (2024.01); *G01N 2021/4792* (2013.01)

(56) References Cited

U.S. PATENT DOCUMENTS 9,092,959 B2     7/2015    Kim et al.

| | | | | |
|---|---|---|---|---|
| 2003/0223063 A1* | 12/2003 | Hill | ............... | G01N 15/1434 356/340 |
| 2008/0246623 A1* | 10/2008 | Nagashima | ............ | G01N 21/53 340/630 |
| 2014/0197957 A1* | 7/2014 | Fischer | ................ | G08B 17/107 340/630 |
| 2015/0187194 A1* | 7/2015 | Hypolite | ................ | G08B 17/10 340/628 |
| 2015/0371514 A1* | 12/2015 | Bonisch | ............... | G08B 17/103 340/630 |
| 2016/0307423 A1* | 10/2016 | Ebner | .................... | G08B 17/12 |
| 2018/0224373 A1* | 8/2018 | Lincoln | ................. | G01N 15/06 |
| 2021/0123864 A1 | 4/2021 | Yang et al. | | |
| 2021/0372913 A1* | 12/2021 | Bachels | ............. | G08B 17/107 |
| 2022/0051538 A1* | 2/2022 | Hartwig | ............. | G08B 17/113 |
| 2023/0349807 A1* | 11/2023 | Deliwala | ............. | G08B 17/113 |

FOREIGN PATENT DOCUMENTS

| | | | | |
|---|---|---|---|---|
| EP | 3214425 B1 * | 9/2019 | ............ | G01N 15/06 |
| JP | 3071092 B2 | 5/2000 | | |
| JP | 6399780 B2 | 9/2018 | | |
| KR | 10-2019-0076433 A | 7/2019 | | |
| KR | 102190346 B1 | 12/2020 | | |
| KR | 10-2021-0049661 A | 5/2021 | | |
| KR | 10-2021-0087909 A | 7/2021 | | |

\* cited by examiner

LED 1 (FIRST WAVELENGTH): 380 ~ 480nm
LED 2 (SECOND WAVELENGTH): 850 ~ 950nm

APPARATUS AND METHOD FOR DETECTING SMOKE BASED ON POLARIZATION

CROSS-REFERENCE TO RELATED APPLICATION

This application claims priority to and the benefit of Korean Patent Application No. 10-2021-0186331, filed on Dec. 23, 2021, the disclosure of which is incorporated herein by reference in its entirety.

BACKGROUND

1. Technical Field

The present disclosure relates to an apparatus and method for detecting smoke based on polarization.

2. Related Art

A general fire detector refers to a device for determining a fire by detecting heat and smoke produced in the event of a fire. Types of fire detectors are classified into a heat-sensing fire detector and a smoke-sensing fire detector.

The heat-sensing fire detectors are classified into a constant-temperature fire detector configured to determine a fire when a temperature around the fire detector is raised to a predetermined temperature or higher, and a differential fire detector configured to operate when a temperature increase rate exceeds a critical value.

In addition, the smoke-sensing fire detectors are classified into an ionized fire detector configured to measure a change in ion current value caused by smoke, and a photoelectric fire detector configured to detect light scattering caused by smoke particles.

Meanwhile, recently, there is an increasing use of the photoelectric fire detector used to quickly detect a fire. The photoelectric fire detector is structured such that when smoke is introduced into a chamber in the photoelectric fire detector, and light is scattered by the introduced smoke particles, the photoelectric fire detector detects the scattered light and raises a fire alarm.

However, even in a case in which not only actual fire smoke but also fine particles such as cooking smoke, cigarette smoke, moisture vapor, and fine dust, which are produced in daily life but are not fire smoke, are introduced, the photoelectric fire detector in the related art determines a fire and raises an alarm. For this reason, there is a problem in that a non-fire alarm is frequently raised.

Such a non-fire alarm causes the personnel of the fire department to be erroneously pressed into service, which wastes administrative power and causes ordinary people to ignore a fire alarm even if the fire alarm occurs. In some instances, the ordinary person turns off the fire detector to avoid a false alarm. For this reason, even if a real fire occurs, the fire detector does not operate, which causes serious life and property damage.

SUMMARY

The present disclosure has been made in an effort to provide a photoelectric fire detector capable of detecting a fire by using light scattering caused by smoke particles. In particular, the present disclosure has been made in an effort to provide an apparatus and method for detecting smoke based on polarization, which have a function capable of distinguishing between fire smoke and non-fire analogous smoke by using the principle that polarization scattering properties of light are changed by smoke particles.

However, technical problems to be solved by the present disclosure are not limited to the aforementioned technical problem, and other technical problems may be present.

Various embodiments are directed to an apparatus for detecting smoke based on polarization, the apparatus including: a chamber into which smoke is introduced; a detection unit comprising a light-emitting unit configured to emit light beams having a plurality of different wavelengths into a space in the chamber, and a light-receiving unit configured to receive scattered light from a plurality of light sources; a control unit configured to control an operation of the detection unit; and a fire determination unit configured to distinguish between fire smoke and non-fire analogous smoke by detecting and analyzing a light-receiving signal received by the light-receiving unit. In this case, horizontal polarization and vertical polarization are applied to the plurality of light sources of the light-emitting unit and the light-receiving unit.

Various embodiments are directed to a method performed by an apparatus for detecting smoke based on polarization, the method including: periodically controlling and turning on or off a light-emitting unit configured to emit light beams having a plurality of different wavelengths into a space in a chamber into which determination target smoke is introduced; controlling a light-receiving unit to receive scattered light scattered by the determination target smoke introduced into the chamber; and determining the determination target smoke as any one of fire smoke and non-fire analogous smoke by detecting and analyzing a light-receiving signal received by the light-receiving unit. In this case, horizontal polarization and vertical polarization are applied to the plurality of light sources of the light-emitting unit and the light-receiving unit.

A computer program according to another aspect of the present disclosure to solve the above-mentioned technical problem executes the method of detecting smoke based on polarization by being combined with a computer that is hardware, and the computer program is stored in a computer-readable recording medium.

Other detailed matters of the present disclosure are included in the detailed description and the drawings.

According to the embodiment of the present disclosure described above, the apparatus and method for detecting smoke having the function of distinguishing between fire and non-fire may reduce a false alarm caused by a non-fire alarm made by smoke produced in daily life and prevent the firefighters from being erroneously pressed into service.

The effects of the present disclosure are not limited to the aforementioned effects, and other effects, which are not mentioned above, will be clearly understood by those skilled in the art from the following description.

DETAILED DESCRIPTION

Advantages and features of the present disclosure and methods of achieving the advantages and features will be clear with reference to embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims.

The terms used in the present specification are for explaining the exemplary embodiments, not for limiting the present disclosure. Unless particularly stated otherwise in the present specification, a singular form also includes a plural form. The term "comprise" and/or "comprising" used in the specification does not exclude existence or addition of one or more other constituent elements in addition to the mentioned constituent element. Like reference denotations refer to like elements throughout the specification. As used herein, the term "and/or" includes each and all combinations of one or more of the mentioned components. Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure.

Unless otherwise defined, all terms (including technical and scientific terms) used in the present specification may be used as the meaning which may be commonly understood by the person with ordinary skill in the art, to which the present disclosure belongs. In addition, terms defined in a generally used dictionary shall not be construed in ideal or excessively formal meanings unless they are clearly and specially defined in the present specification.

Hereinafter, the background art related to the present disclosure will be described first, and then the embodiment of the present disclosure will be described to assist those skilled in the art in understanding the present disclosure.

Figure 1:
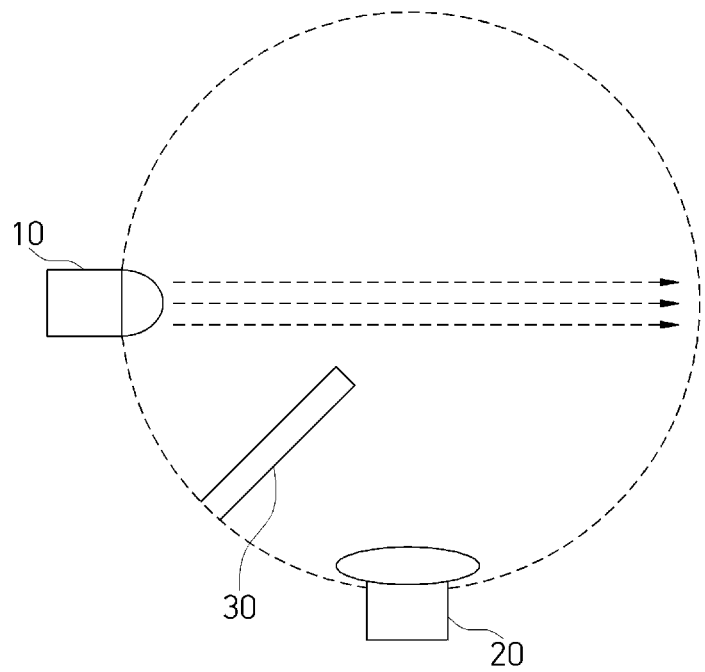
FIG. 1 is a view for schematically explaining a general photoelectric fire detector in the related art.
Figure 2:
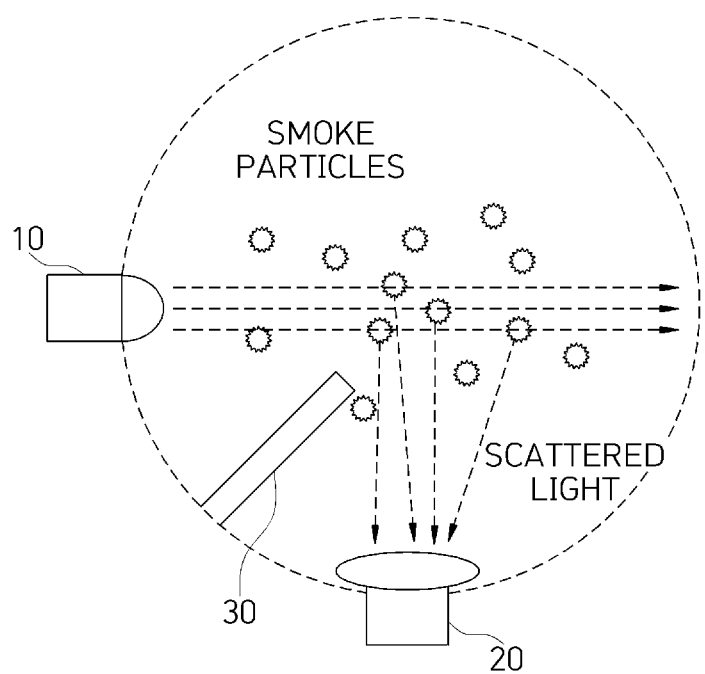
FIG. 2 is a view for explaining a state in which a photoelectric fire detector operates as smoke particles are introduced into the photoelectric fire detector.

FIG. 1 is a view for schematically explaining a general photoelectric fire detector in the related art. FIG. 2 is a view for explaining a state in which a photoelectric fire detector operates as smoke particles are introduced into the photoelectric fire detector.

A photoelectric fire detector in the related art includes an infrared light-emitting unit 10 and a light-receiving unit 20. When light emitted from the light-emitting unit 10 is inputted to the light-receiving unit 20, the fire detector operates.

In a chamber, a light-blocking wall 30 or the light-emitting unit 10 and the light-receiving unit 20 are disposed in a staggered manner so that a predetermined angle is maintained therebetween. Therefore, in a general environment in which no smoke particle is introduced, the light emitted from the light-emitting unit 10 is not detected by the light-receiving unit 20.

As described above, in an environment in the chamber in the photoelectric fire detector in the related art in which no smoke particle is present, the light-emitting unit 10 does not interfere with the light-receiving unit 20, such that the light is not detected by the light-receiving unit 20. However, when smoke particles are introduced into the detector, the light emitted from the infrared light-emitting unit 10 is scattered by smoke particles, and the scattered light is inputted into the light-receiving unit 20, such that the light-receiving unit 20 operates.

Because the photoelectric fire detector in the related art reacts with the aerosol particles, the photoelectric fire detector in the related art reacts with smoke such as cooking smoke in a kitchen, cigarette smoke, moisture vapor, and fine dust, which are produced in daily life, as well as smoke produced by a fire. For this reason, there is a problem in that a non-fire alarm frequently occurs.

To solve the above-mentioned problem, the embodiment of the present disclosure may distinguish between fire smoke and non-fire analogous smoke by using polarization properties of light.

The polarization is made by analyzing light as electromagnetic waves in view of wave optics and refers to a phenomenon in which an electric or magnetic field, which constitutes the electromagnetic waves, vibrates in a particular direction when the electromagnetic waves propagate. In this case, because the light may be analyzed as the electric field, the light is generally in a state in which light beams vibrating in all directions perpendicular to the propagation direction are mixed only in consideration of the electric field. However, the polarization allows the light to vibrate only in a particular direction by using a particular filter. That is, the polarization may mean light that propagates while vibrating in a particular direction.

The polarization may be generally classified into linear polarization, circular polarization, and elliptical polarization. Because the light includes transverse waves, the light propagating in a z-axis direction may be expressed as an x component A cos(wt−kz) and a y component B cos(wt−kz+ϕ). Here, A and B represent intensity of the light in the respective directions, w represents an oscillation frequency, t represents time, k represents a frequency, z represents a position, and ϕ represents a phase difference between the two components. In this case, when A or B is 0, the linear polarization (vertical or horizontal polarization) is made. When A=B and ϕ=90° or ϕ=−90°, the circular polarization (right polarization or left polarization) is made. When A and B are not 0, A≠B, and ϕ≠0, ±90°, the elliptical polarization is made.

Meanwhile, a Stokes vector using Stokes variables may be proposed to describe the polarization properties of the light, and the Stokes vector is expressed as Equation 1. Here, in represents incident light, and sc represents scattered light.

$$\begin{bmatrix} I_{sc} \\ Q_{sc} \\ U_{sc} \\ V_{sc} \end{bmatrix} = \frac{\lambda^2}{4\pi^2 D^2} \begin{pmatrix} F_{11} & F_{12} & F_{13} & F_{14} \\ F_{12} & F_{22} & F_{23} & F_{24} \\ -F_{13} & -F_{23} & F_{33} & F_{34} \\ F_{14} & F_{24} & -F_{34} & F_{44} \end{pmatrix} \begin{bmatrix} I_{in} \\ Q_{in} \\ U_{in} \\ V_{in} \end{bmatrix} \quad \text{[Equation 1]}$$

I, Q, U, and V represent shapes of the polarization, and the shapes of the polarization are shown in Table 1.

TABLE 1

| Shapes of Polarization | Non-polarization | Horizontal Polarization | Vertical Polarization | +45° Polarization | −45° Polarization | Right Circular Polarization | Left Circular Polarization |
|---|---|---|---|---|---|---|---|
| I | 1 | 1 | 1 | 1 | 1 | 1 | 1 |
| Q | 0 | 1 | −1 | 0 | 0 | 0 | 0 |
| U | 0 | 0 | 0 | 1 | −1 | 0 | 0 |
| V | 0 | 0 | 0 | 0 | 0 | 1 | −1 |

The present disclosure is characterized by using horizontal polarization properties and vertical polarization properties among the polarization properties of light. Therefore, since only I and Q are present in Table 1 and Equation 1, Equation 1 may be organized as Equation 2 below.

$$\begin{bmatrix} I_{sc} \\ Q_{sc} \\ 0 \\ 0 \end{bmatrix} = \frac{\lambda^2}{4\pi^2 D^2} \begin{pmatrix} F_{11} & F_{12} & 0 & 0 \\ F_{12} & F_{22} & 0 & 0 \\ 0 & 0 & 0 & 0 \\ 0 & 0 & 0 & 0 \end{pmatrix} \begin{bmatrix} I_{in} \\ Q_{in} \\ U_{in} \\ V_{in} \end{bmatrix} \quad \text{[Equation 2]}$$

Equation 2 may be organized again as Equation 3. In this case, the subscript 0 means incident light, ∥ means the horizontal polarization, and ⊥ means the vertical polarization.

$$\begin{bmatrix} I_{sc} \\ Q_{sc} \end{bmatrix} = \frac{\lambda^2}{4\pi^2 D^2} \begin{pmatrix} F_{11} & F_{12} \\ F_{12} & F_{22} \end{pmatrix} \begin{bmatrix} I_0 \\ Q_0 \end{bmatrix} \quad \text{[Equation 3]}$$

$$I = I_\parallel + I_\perp, \quad I_0 = I_{0\parallel} + I_{0\perp}$$

$$Q = I_\parallel - I_\perp, \quad Q_0 = I_{0\parallel} - I_{0\perp}$$

Therefore, assuming that the light source is constant, scattering matrix elements of the Stokes vector shown in Equation 4 may be obtained by means of detection values of the horizontal and vertical polarization.

$$I_{\parallel\parallel} I_{\perp\parallel} I_{\parallel\perp} I_{\perp\perp} \rightarrow \begin{pmatrix} F_{11} & F_{12} \\ F_{12} & F_{22} \end{pmatrix} \quad \text{[Equation 4]}$$

Hereinafter, an apparatus 100 for detecting smoke based on polarization according to an embodiment of the present disclosure will be described with reference to FIGS. 3 to 5B.

Figure 3:
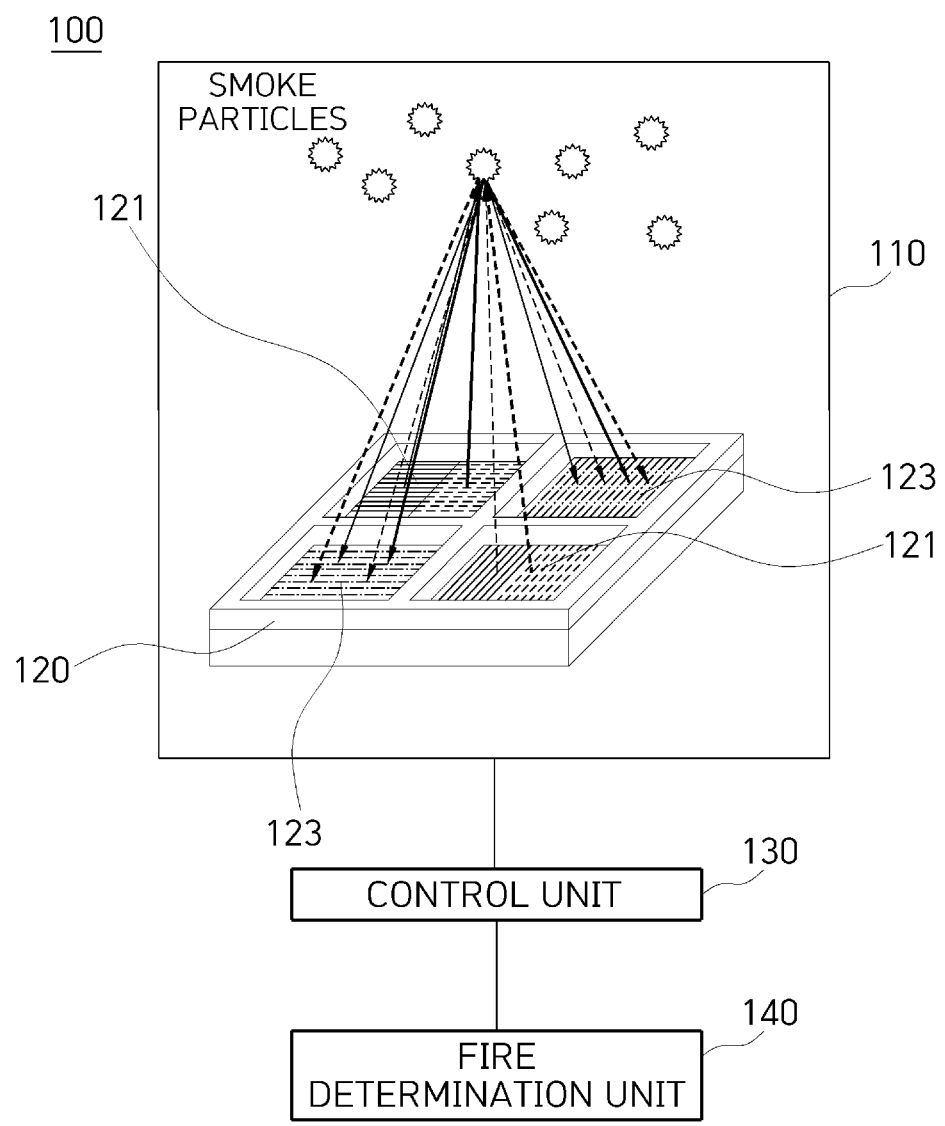
FIG. 3 is a view for explaining an apparatus for detecting smoke based on polarization according to an embodiment of the present disclosure.

FIG. 3 is a view for explaining the apparatus 100 for detecting smoke based on polarization according to an embodiment of the present disclosure. FIG. 3 is a view illustrating the apparatus 100 for detecting smoke, which is configured to measure the detection values for constituting the scattering matrix in Equation 4.

The apparatus 100 for detecting smoke based on polarization according to the embodiment of the present disclosure includes: a chamber 110; a detection unit 120 including a light-emitting unit 121 and a light-receiving unit 123; a control unit 130, and a fire determination unit 140.

The chamber 110 has a smoke detection space into which smoke is introduced. The light-emitting unit 121 emits light to the smoke detection space. The light-receiving unit 123 receives scattered light generated when the emitted light is scattered by smoke.

The detection unit 120 includes the light-emitting unit 121 and the light-receiving unit 123. The light-emitting unit 121 emits light beams having a plurality of different wavelengths into the space in the chamber 110. The light-receiving unit 123 detects scattered light made when the light beams for the respective wavelengths are scattered by smoke particles.

In this case, as illustrated in FIG. 3, a partition wall is provided between the light-emitting unit 121 and the light-receiving unit 123 to prevent a leak of light, i.e., prevent the light emitted from the light-emitting unit 121 from being detected by the light-receiving unit 123.

The control unit 130 controls an operation of the detection unit 120.

The fire determination unit 140 detects and analyzes a light-receiving signal from the light-receiving unit 123 and distinguishes between fire smoke and non-fire smoke.

Figure 4A:
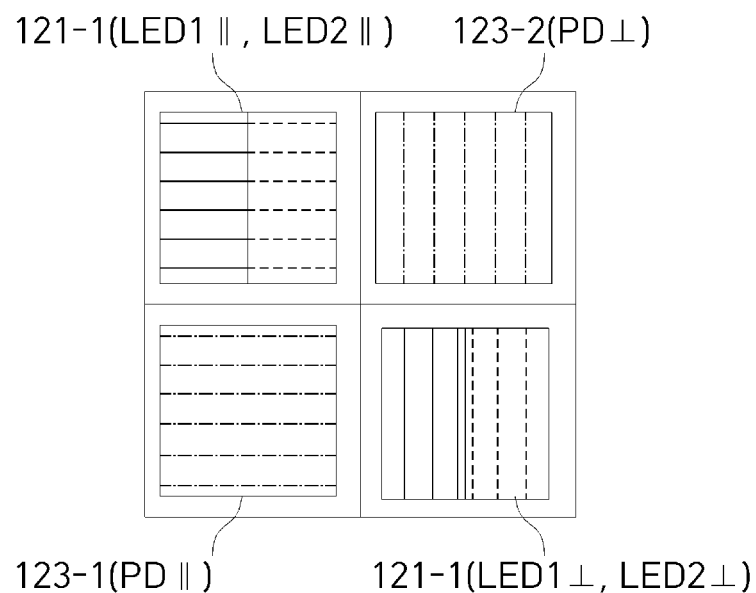
FIGS. 4A to 4C are views for explaining a light-emitting unit and a light-receiving unit according to the embodiment of the present disclosure.
Figure 4B:
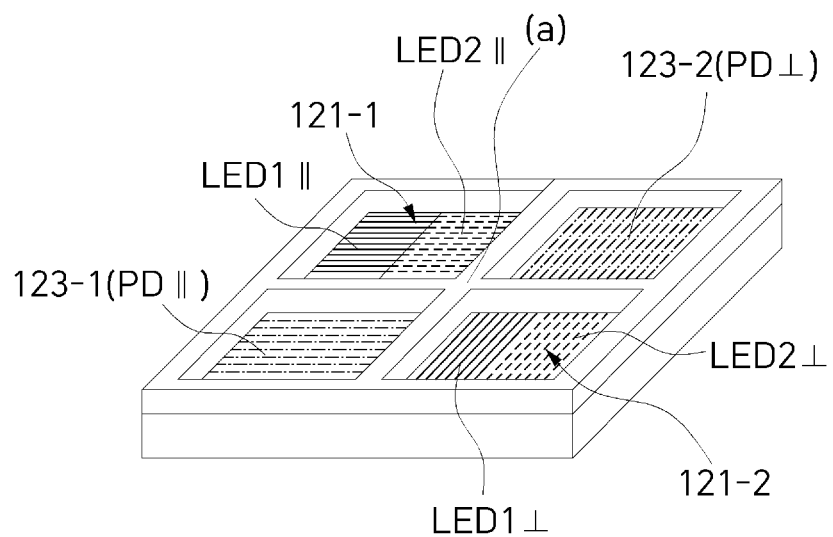
Figure 4C:
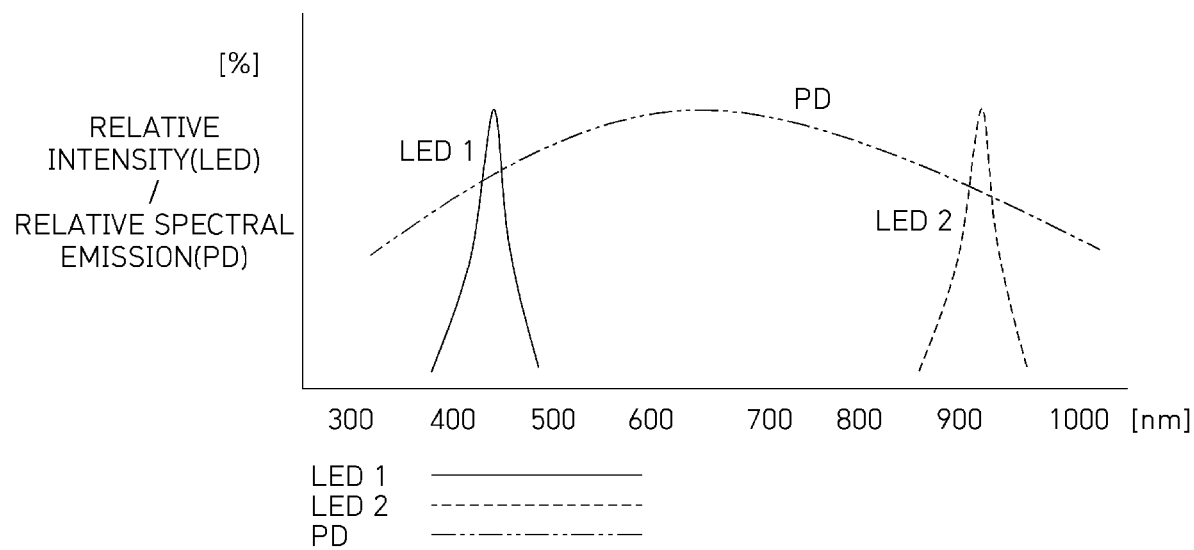

FIGS. 4A to 4C are views for explaining the light-emitting unit 121 and the light-receiving unit 123 according to the embodiment of the present disclosure.

In the embodiment of the present disclosure, the light-emitting unit 121 may include a plurality of light sources configured to emit light beams having a plurality of different wavelengths. The light-receiving unit 123 may include at least one photodiode configured to receive the light beams having the plurality of wavelengths while distinguishing between the plurality of wavelengths.

Referring to FIG. 4A, in one embodiment, the light-emitting unit 121 may include: a first light source 121-1 having a first wavelength band of 380 to 480 nm and adopting the horizontal polarization; and a second light source 121-2 having a second wavelength band of 850 to 950 nm and adopting the vertical polarization. In this case, the present disclosure is not necessarily limited to the number of light sources and the specific numerical values of the first and second wavelength bands. The number of light sources and the specific numerical values of the first and second wavelength bands may be variously modified and implemented in accordance with performance elements and costs of the product.

The light-receiving unit 123 may be configured as a photodiode capable of receiving both the first and second wavelength bands corresponding to the above-mentioned configuration. That is, the light-receiving unit may include a first photodiode 123-1 adopting the horizontal polarization corresponding to the first and second light sources, and a second photodiode 123-2 adopting the vertical polarization.

Referring to FIG. 4B, the first and second light sources 121-1 and 121-2 of the light-emitting unit 121 and the first and second photodiodes 123-1 and 123-2 may be disposed in a lattice shape. That is, in the arrangement structure of the light-emitting unit 121 and the light-receiving unit 123 of the detection unit 120 in the embodiment of the present disclosure, the light-emitting unit 121 and the light-receiving unit 123 are disposed in the lattice structure in order to minimize a detection signal difference caused by an arrangement distance between the light-emitting unit 121 adopting the horizontal polarization and the vertical polarization and the light-receiving unit 123 adopting the horizontal polarization and the vertical polarization.

As illustrated in FIG. 4B, the first light source 121-1 is disposed in a left upper end region of the detection unit, the first photodiode 123-1 is disposed in a lower end region based on the first light source 121-1, and the second photodiode 123-2 is disposed in a right region. Further, the second light source 121-2 is disposed in a diagonal direction with respect to the first light source 121-1. In this case, a partition wall or shield structure a is provided between the first and second light sources 121-1 and 121-2 and between the first and second photodiodes 123-1 and 123-2. That is, in consideration of the configuration in which the light-emitting unit 121 and the light-receiving unit 120 are positioned at a short distance in the embodiment of the present disclosure, the partition wall or shield structure a is applied between the lattice arrangements in order to reduce an influence of light leaking from the light-emitting unit instead of the reflection by the smoke particles.

Meanwhile, as illustrated in FIG. 4C, the control unit 130 may check characteristics for respective wavelengths by analyzing the light-receiving signals in respect to the light from the first and second light sources 121-1 and 121-2 by using the first and second photodiodes 123-1 and 123-2.

Figure 5A:
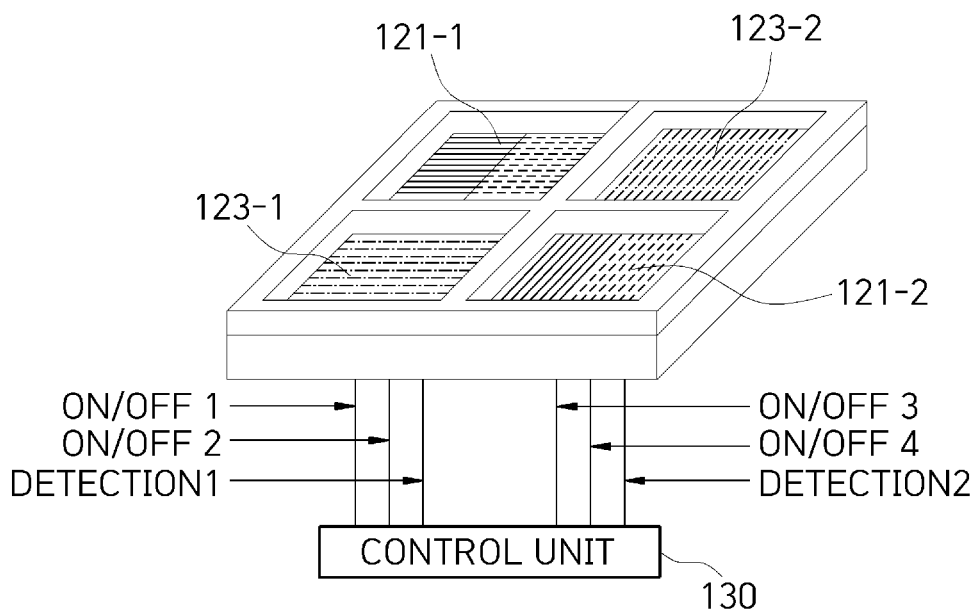
FIGS. 5A and 5B are views for explaining the timing of controlling the light-emitting unit and the light-receiving unit according to the embodiment of the present disclosure.
Figure 5B:
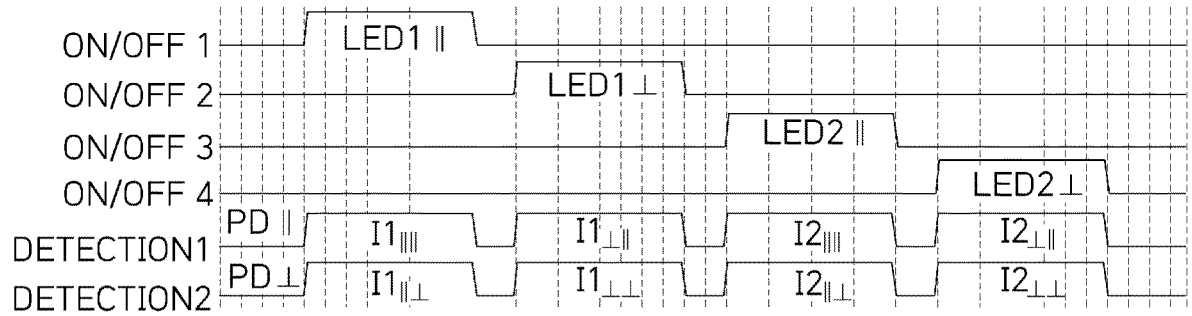

FIGS. 5A and 5B are views explaining the timing of controlling the light-emitting unit 121 and the light-receiving unit 123 according to the embodiment of the present disclosure.

In one embodiment, the control unit 130 may perform on/off control on the first light source 121-1 and the second light source 121-2 of the light-emitting unit which emit light with two wavelengths. In this case, the control unit 130 may perform the on/off control on the LEDs of the light-emitting unit including a total of four light sources, i.e., the first and second light sources 121-1 and 121-2 which adopt the horizontal polarization and the vertical polarization and emit light with the two wavelengths.

The control unit 130 may perform control so that the light-emitting times of the plurality of first and second light sources 121-1 and 121-2 of the light-emitting unit 121 are different in one cycle in order to prevent interference between the plurality of wavelengths.

For example, the first light source 121-1 and the second light source 121-2 may be alternately turned on and off according to the light-emitting times. As another example, the light source having the vertical polarization and the light source having the horizontal polarization may be alternately turned on and off.

That is, at the first light-emitting time, the on/off control is performed on the LED having the first wavelength band of the first light source 121-1 adopting the horizontal polarization. Thereafter, at the second light-emitting time, the on/off control is performed on the LED having the first wavelength band of the second light source 121-2 adopting the vertical polarization. Next, at the third light-emitting time, the on/off control is performed on the LED having the second wavelength band of the first light source 121-1 adopting the horizontal polarization. Thereafter, at the fourth light-emitting time, the on/off control is performed on the LED having the second wavelength band of the second light source 121-2 adopting the vertical polarization.

In addition, the control unit 130 performs control to detect a light-receiving signal when the LEDs of the first and second photodiodes 123-1 and 123-2 adopting the horizontal polarization and the vertical polarization are turned on.

In this case, the control unit sets different light-emitting times in one cycle and sequentially performs on/off control on the first and second light sources 121-1 and 121-2 at a predetermined time interval so that the first and second light sources 121-1 and 121-2 do not interfere with each other. The light-receiving unit 123 detects the light-receiving signal corresponding to the light-emitting time in the same cycle.

For example, the first photodiode 123-1 of the light-receiving unit 123 continuously detects first and second light-receiving signals received through the first and second light sources 121-1 and 121-2 having the first wavelength band and third and fourth light-receiving signals received through the first and second light sources 121-1 and 121-2 having the second wavelength band.

In addition, the second photodiode 123-2 continuously detects first and second light-receiving signals received through the first and second light sources 121-1 and 121-2 having the first wavelength band and third and fourth light-receiving signals received through the first and second light sources 121-1 and 121-2 having the second wavelength band.

As described above, the control unit 130 repeatedly controls the light-emitting unit 121 and the light-receiving unit 123 so that the light-emitting unit 121 and the light-receiving unit 123, which are controlled in one cycle, operate as the fire detectors.

Meanwhile, in the embodiment of the present disclosure, the fire determination unit 140 may calculate a scattering matrix in response to a light-receiving signal of the light-receiving unit 123 in respect to the scattered light detected by the control unit 130 and distinguish between fire smoke and non-fire analogous smoke.

Equation 5 below shows the scattering matrix calculated in response to the light-receiving signal of the light-receiving unit 123 in respect to the scattered light detected by the control unit 130.

$$\begin{bmatrix} F_{11} & F_{12} \\ F_{12} & F_{22} \end{bmatrix}$$ [Equation 5]

$$F_{11} = \frac{2\pi^2 D^2}{\lambda^2}(I_{\|\|} + I_{\|\perp} + I_{\perp\|} + I_{\perp\perp})$$

$$F_{12} = \frac{2\pi^2 D^2}{\lambda^2}(I_{\|\|} + I_{\|\perp} - I_{\perp\|} - I_{\perp\perp})$$

$$F_{21} = \frac{2\pi^2 D^2}{\lambda^2}(I_{\|\|} - I_{\|\perp} + I_{\perp\|} - I_{\perp\perp})$$

$$F_{22} = \frac{2\pi^2 D^2}{\lambda^2}(I_{\|\|} - I_{\|\perp} - I_{\perp\|} + I_{\perp\perp})$$

$$I1_{\|\|} I1_{\|\perp} I1_{\perp\|} I1_{\perp\perp} \rightarrow \begin{bmatrix} F1_{11} & F1_{12} \\ F1_{12} & F1_{22} \end{bmatrix}$$

$$I2_{\|\|} I2_{\|\perp} I2_{\perp\|} I2_{\perp\perp} \rightarrow \begin{bmatrix} F2_{11} & F2_{12} \\ F2_{12} & F2_{22} \end{bmatrix}$$

In Equation 5 above, I represents the light-receiving signal which is a measured value of the light-receiving unit 123, the subscript ∥ represents the horizontal polarization, and ⊥ represents the vertical polarization. In addition, in the consecutive subscripts ∥∥, the front subscript ∥ represents the horizontal polarization emitted from the light source, and the rear subscript ∥ means that the horizontal polarization is applied to the light-receiving unit 123.

More specifically, $I_{\|\|}$ represents a signal received with the horizontal polarization from the light source with the horizontal polarization, $I_{\|\perp}$ represents a signal received with the vertical polarization from the light source with the horizontal polarization, $I_{\perp\|}$ represents a signal received with the horizontal polarization from the light source with the vertical polarization, and $I_{\perp\perp}$ represents a signal received with the vertical polarization from the light source with the vertical polarization.

The fire determination unit 140 calculates a first scattering matrix in response to the light-receiving signal in respect to the first wavelength band among the first to fourth light-receiving signals of the first and second photodiodes 123-1 and 123-2. In addition, the fire determination unit calculates a second scattering matrix in response to the light-receiving signal in respect to the second wavelength band. That is, in the embodiment of the present disclosure, the first and second light sources 121-1 and 121-2 use the two wavelengths, such that the two scattering matrices are defined in respect to the first and second wavelengths.

The fire determination unit 140 may distinguish between fire smoke and non-fire analogous smoke on the basis of a combination of the scattering matrix values of the first and second scattering matrices. For example, the fire determination unit may distinguish between fire and non-fire on the basis of a mathematical combination of the scattering matrix value such as $$\frac{F_{22}}{F_{11}} \text{ or } \frac{-F_{12}}{F_{11}}$$

in respect to the first and second scattering matrices shown in Equation 5.

As another embodiment, the fire determination unit 140 may distinguish between fire smoke and non-fire analogous smoke on the basis of a result of comparing scattering matrix values at the same position in the first and second scattering matrices. That is, the fire determination unit 140 may distinguish between fire smoke and non-fire analogous smoke on the basis of a result of comparing $F1_{11}$ and $F2_{11}$.

Meanwhile, the mathematical combination may be variously derived by properties and sizes of the smoke particles. Therefore, the embodiment of the present disclosure is not limited to a particular mathematical combination.

Figure 6:
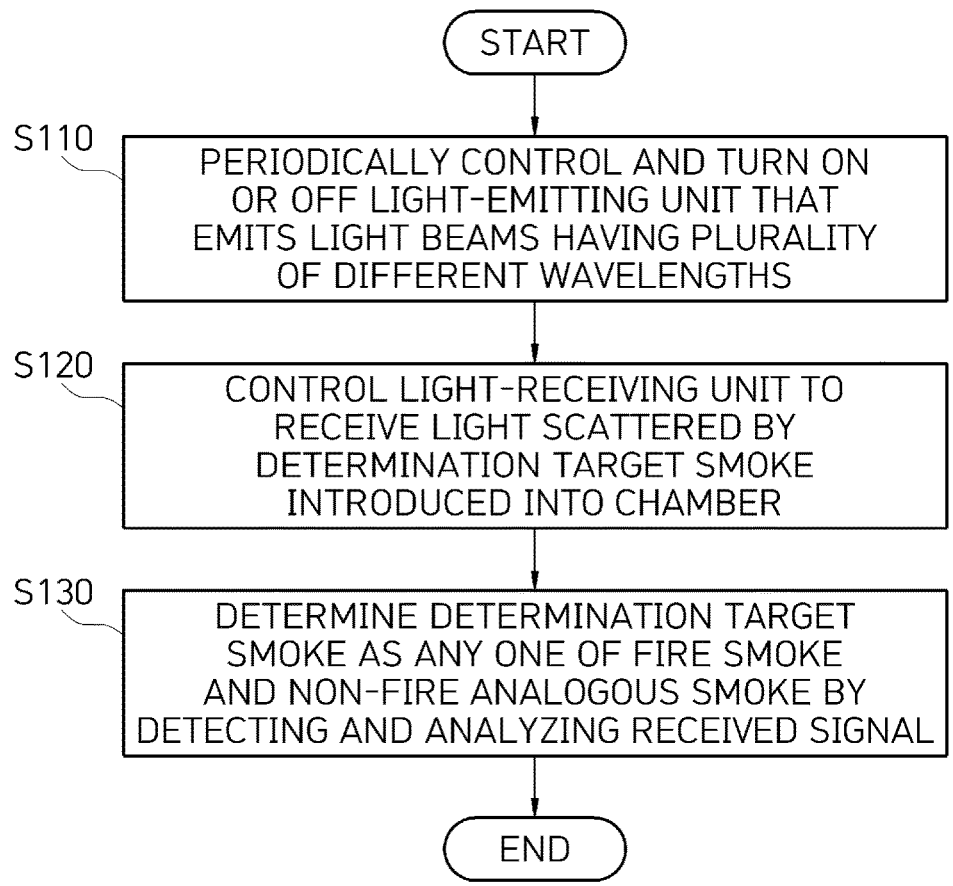
FIG. 6 is a flowchart of a method of detecting smoke based on polarization according to the embodiment of the present disclosure.

FIG. 6 is a flowchart of a method of detecting smoke based on polarization according to the embodiment of the present disclosure. Meanwhile, the steps illustrated in FIG. 6 may be understood as being performed by the apparatus 100 for detecting smoke, but the present disclosure is not necessarily limited thereto.

First, the light-emitting unit 121, which emits light beams having the plurality of different wavelengths into the space in the chamber 110 into which determination target smoke is introduced, is periodically controlled and turned on or off (S110).

Next, the light-receiving unit 123 is controlled to receive the light scattered by the determination target smoke introduced into the chamber 110 (S120). In this case, the embodiment of the present disclosure is characterized by applying the horizontal polarization and the vertical polarization to the plurality of light sources of the light-emitting unit 121 and the light-receiving unit.

Next, the determination target smoke is determined as any one of fire smoke and non-fire analogous smoke by detecting and analyzing the signal received by the light-receiving unit 123 (S130).

Meanwhile, in the above-mentioned description, steps S110, S120, and S130 may be divided into additional steps or combined into fewer steps according to the embodiment of the present disclosure. In addition, some steps may be eliminated as necessary. The order of the steps may be changed. Further, the contents related to the apparatus 100 for detecting smoke illustrated in FIGS. 3 to 5B may be applied to the features illustrated in FIG. 6 even though the contents are omitted.

The method of detecting smoke based on polarization according to the embodiment of the present disclosure described above may be implemented as a program (or application) and stored in a medium so as to be executed by being combined with a computer that is hardware.

For the computer to read the program and execute the methods implemented with the program, the above-mentioned program may include a code encoded into a computer language such as C, C++, Java, Ruby, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a predetermined procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The storage medium may refer to a device-readable medium which stores data on a semipermanent basis rather than a medium, such as a register, a cache, or a memory, which stores data during a short moment. Specifically, the storage medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the computer or various storage media on the computer of the user. In addition, the medium may be distributed to a computer system connected over a network and may store a computer-readable code on a distributed basis.

It will be appreciated that the embodiments of the present disclosure have been described above for purposes of illustration, and those skilled in the art may understand that the present disclosure may be easily modified in other specific forms without changing the technical spirit or the essential features of the present disclosure. Therefore, it should be understood that the above-described embodiments are illustrative in all aspects and do not limit the present disclosure. For example, each component described as a single type may be carried out in a distributed manner. Likewise, components described as a distributed type can be carried out in a combined type.

The scope of the present disclosure is represented by the claims to be described below rather than the detailed description, and it should be interpreted that the meaning and scope of the claims and all the changes or modified forms derived from the equivalent concepts thereto fall within the scope of the present disclosure.

What is claimed is:

1. An apparatus for detecting smoke based on polarization, the apparatus comprising:
 a chamber into which smoke is introduced;
 a detection unit comprising a light-emitting unit configured to emit light beams having a plurality of different wavelengths into a space in the chamber, and a light-receiving unit, comprising a plurality of photodiodes, and configured to receive scattered light from a plurality of light sources of the light-emitting unit;
 a control unit configured to control an operation of the detection unit; and
 a fire determination unit configured to distinguish between fire smoke and non-fire analogous smoke by detecting and analyzing a light-receiving signal received by the light-receiving unit,
 wherein horizontal polarization and vertical polarization are applied to the plurality of light sources of the light-emitting unit and the light-receiving unit,
 wherein the light-receiving unit comprises:
  a first photodiode of the plurality of photodiodes adopting the horizontal polarization corresponding to the first and second light sources and configured to simultaneously receive the first and second wavelength bands; and
  a second photodiode of the plurality of photodiodes adopting the vertical polarization corresponding to the first and second light sources and configured to simultaneously receive the first and second wavelength bands.

2. The apparatus of claim 1, wherein the light-emitting unit comprises:
 a first light source of the plurality of light sources having a first wavelength band of 380 to 480 nm and adopting the horizontal polarization; and
 a second light source of the plurality of light sources having a second wavelength band of 850 to 950 nm and adopting the vertical polarization.

3. The apparatus of claim 2, wherein the first and second light sources of the light-emitting unit and the first and second photodiodes are disposed in a lattice shape.

4. The apparatus of claim 3, wherein a partition wall or shield structure is provided between the lattice arrangements.

5. The apparatus of claim 2, wherein the control unit performs control so that light-emitting times of the plurality of first and second light sources of the light-emitting unit are different in one cycle in order to prevent interference between the plurality of light sources, and
 wherein the control unit controls the first and second photodiodes of the light-receiving unit to detect light-receiving signals corresponding to the light-emitting times.

6. The apparatus of claim 5, wherein the control unit continuously controls and turns on the first light source having the first wavelength band, the first light source having the second wavelength band, the second light source having the first wavelength band, and the second light source having the second wavelength band in accordance with the light-emitting time in the one cycle, and
 wherein the control unit detects light-receiving signals by continuously controlling the first and second photodiodes corresponding to the light-emitting time.

7. The apparatus of claim 6, wherein based on continuous control of the control unit on the first and second photodiode, the first photodiode continuously detects first and second light-receiving signals received through the first and second light sources having the first wavelength band and third and fourth light-receiving signals received through the first and second light sources having the second wavelength band, and the second photodiode continuously detects first and second light-receiving signals received through the first and second light sources having the first wavelength band and third and fourth light-receiving signals received through the first and second light sources having the second wavelength band.

8. The apparatus of claim 7, wherein the fire determination unit calculates a first scattering matrix in response to the light-receiving signal in respect to the first wavelength band among the first to fourth light-receiving signals of the first and second photodiode and calculates a second scattering matrix in response to the light-receiving signal in respect to the second wavelength band, and
 wherein the fire determination unit distinguishes between fire smoke and non-fire analogous smoke on the basis of a combination of scattering matrix values of the first and second scattering matrices.

9. The apparatus of claim 8, wherein the fire determination unit distinguishes between the fire smoke and the non-fire analogous smoke on the basis of a result of comparing the scattering matrix values at the same position in the first and second scattering matrices.

10. A method performed by an apparatus for detecting smoke based on polarization, the method comprising:
 periodically controlling and turning on or off a light-emitting unit comprising a plurality of light sources, and configured to emit light beams having a plurality of different wavelengths into a space in a chamber into which determination target smoke is introduced;
 controlling a light-receiving unit, comprising a plurality of photodiodes, to receive scattered light scattered by the determination target smoke introduced into the chamber; and
 determining the determination target smoke as any one of fire smoke and non-fire analogous smoke by detecting and analyzing a light-receiving signal received by the light-receiving unit,
 wherein horizontal polarization and vertical polarization are applied to a plurality of light sources of the light-emitting unit and the light-receiving unit,
 wherein the controlling of the light-receiving unit to receive the scattered light scattered by the determination target smoke introduced into the chamber comprises receiving the light-receiving signal through the light-receiving unit comprising a first photodiode of the plurality of photodiodes adopting the horizontal polarization corresponding to the first and second light sources and configured to simultaneously receive the first and second wavelength bands; and
 a second photodiode of the plurality of photodiodes adopting the vertical polarization corresponding to the first and second light sources and configured to simultaneously receive the first and second wavelength bands.

11. The method of claim 10, wherein the periodically controlling and turning on or off of the light-emitting unit configured to emit the light beams having the plurality of different wavelengths comprises periodically controlling and turning on or off a first light source of the plurality of light sources having a first wavelength band of 380 to 480 nm and adopting the horizontal polarization and a second light source of the plurality of light sources having a second wavelength band of 850 to 950 nm and adopting the vertical polarization.

12. The method of claim 11, wherein the first and second light sources of the light-emitting unit and the first and second photodiode are disposed in a lattice shape, and a partition wall or shield structure is provided between the lattice arrangements.

13. The method of claim 11, wherein the periodically controlling and turning on or off of the light-emitting unit configured to emit the light beams having the plurality of different wavelengths comprises continuously controlling and turning on the first light source having the first wavelength band, the first light source having the second wavelength band, the second light source having the first wavelength band, and the second light source having the second wavelength band in accordance with the light-emitting time in the one cycle, and
wherein the controlling of the light-receiving unit to receive the scattered light scattered by the determination target smoke introduced into the chamber comprises controlling the first and second photodiodes of the light-receiving unit to detect the light-receiving signals corresponding to the light-emitting times.

14. The method of claim 13, wherein the controlling of the light-receiving unit to receive the scattered light scattered by the determination target smoke introduced into the chamber comprises continuously detecting, by the first photodiode, first and second light-receiving signals received through the first and second light sources having the first wavelength band and third and fourth light-receiving signals received through the first and second light sources having the second wavelength band, and continuously detecting, by the second photodiode, first and second light-receiving signals received through the first and second light sources having the first wavelength band and third and fourth light-receiving signals received through the first and second light sources having the second wavelength band.

15. The method of claim 14, wherein the determining of the determination target smoke as any one of the fire smoke and the non-fire analogous smoke comprises calculating a first scattering matrix in response to the light-receiving signal in respect to the first wavelength band among the first to fourth light-receiving signals of the first and second photodiode, calculating a second scattering matrix in response to the light-receiving signal in respect to the second wavelength band, and distinguishing between fire smoke and non-fire analogous smoke by performing the analysis on the basis of a combination of scattering matrix values of the first and second scattering matrices.

16. The method of claim 15, wherein the determining of the determination target smoke as any one of the fire smoke and the non-fire analogous smoke comprises distinguishing between the fire smoke and the non-fire analogous smoke on the basis of a result of comparing the scattering matrix values at the same position in the first and second scattering matrices.

* * * * *